US008976706B2

(12) United States Patent
Maenpaa et al.

(10) Patent No.: US 8,976,706 B2
(45) Date of Patent: Mar. 10, 2015

(54) LOAD BALANCING METHOD AND SYSTEM FOR PEER-TO-PEER NETWORKS

(75) Inventors: Jouni Maenpaa, Nummela (FI); Jani Hautakorpi, Masala (FI); Ari Keranen, Krikkonummi (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 190 days.

(21) Appl. No.: 13/582,544

(22) PCT Filed: Mar. 12, 2010

(86) PCT No.: PCT/IB2010/000536
§ 371 (c)(1),
(2), (4) Date: Nov. 8, 2012

(87) PCT Pub. No.: WO2011/110883
PCT Pub. Date: Sep. 15, 2011

(65) Prior Publication Data
US 2013/0064090 A1    Mar. 14, 2013

(51) Int. Cl.
*H04L 12/28* (2006.01)
*H04L 29/08* (2006.01)

(52) U.S. Cl.
CPC .......... *H04L 67/104* (2013.01); *H04L 67/1008* (2013.01); *H04L 67/1065* (2013.01); *H04L 67/1002* (2013.01); *H04L 67/1046* (2013.01); *H04L 67/1055* (2013.01)
USPC ....................................... 370/254

(58) Field of Classification Search
USPC ............... 370/235, 252, 254, 395.31, 395.32; 709/203, 204, 220–223
See application file for complete search history.

(56) References Cited

U.S. PATENT DOCUMENTS

| 7,401,132 | B1 | 7/2008 | Krumel et al. |
| 8,254,287 | B2 * | 8/2012 | Jayaram et al. ............... 370/254 |
| 8,484,382 | B2 * | 7/2013 | Das et al. ..................... 709/249 |
| 2009/0234917 | A1 * | 9/2009 | Despotovic et al. .......... 709/204 |

OTHER PUBLICATIONS

Hautakorpi et al, Load Balancing for Structured P2P Networks Using the Advanced Finger Selection Algorithm (AFSA), ACM, 8 pages, Mar. 22, 2010.*
International Search Report issued in corresponding International application No. PCT/IB2010/000536, date of mailing Nov. 11, 2010.

(Continued)

*Primary Examiner* — Frank Duong
(74) *Attorney, Agent, or Firm* — Patent Portfolio Builders PLLC (57) ABSTRACT

System and method for balancing a number of incoming connections of nodes connected to a peer-to-peer network. The method includes receiving at a selecting node information about out-finger candidates. The information includes at least a quantifiable parameter for the out-finger candidates and the out-finger candidates are possible nodes to be connected to the selecting node. The method includes calculating in the selecting node, for each node of the out-finger candidates, a probability value by using a predetermined probability function that uses as input the corresponding quantifiable parameter; and selecting one node from the out-finger candidates to be an out-finger node for the selection node based on the probability value. The probability value is associated with a number of in-finger connections to the selected out-finger node.

20 Claims, 6 Drawing Sheets

(56) References Cited

OTHER PUBLICATIONS

Zoels, Stefan et al., "Load Balancing in a Hierarchical DHT-based P2P System", International Conference on Collaborative Computing: Networking, Applications and Worksharing, 2007. COLLABORATECOM 2007, IEEE, Piscataway, NJ, US, Nov. 12, 2007, pp. 353-361, XP031279279, ISBN: 978-1-4244-1318-8.

Cuevas, Ruben et al., "Routing Fairness in Chord: Analysis and Enhancement", INFOCOM 2009, The 28th Conference on Computer Communications, IEEE, Piscataway, NJ, US, Apr. 19, 2009, pp. 1449-1457, XP031468900, ISBN: 978-1-4244-3512-8.

Godfrey, Brighten et al., "Load Balancing in Dynamic Structured P2P Systems", INFOCOM 2004, Twenty-Third Annual Joint Communications Societies, IEEE, Piscataway, NJ, US, LNKD-DOI:10.1109/INFCOM.2004.1354648, vol. 4, Mar. 7, 2004, pp. 2253-2262, XP010740594, ISBN: 978-0-7803-8355-5.

Bienkowski, Marcien et al., "Dynamic Load Balancing in Distributed Hash Tables", Peer-to-Peer Systems IV Lecture Notes in Computer Science, LNCS, Springer-Verlag, Berlin-Heidelberg, Germany, pp. 217-225, XP019019947, ISBN: 978-3-540-29068-1, Jan. 1, 2005.

Byers, John et al., "Simple Load Balancing for Distributed Hash Tables", Parallel and Distributed Processing and Applications: Second International Symposium, ISPA 2004 Proceedings, Hong Kong, China, Dec. 13-15, 2004, Springer-Verlag, Berlin-Heidelberg, Germany, vol. 2735, Feb. 21, 2003, pp. 80-88, XP002298333, ISBN: 978-3-540-24128-7.

Ktari, Salma et al., "Exploiting Routing Unfairness in DHT Overlays", Symposium on Computers and Communications, 2009, IEEE, Jul. 5-8, 2009, TELCOM Paris Tech, Paris, France, ISBN: 978-1-4244-4671-1.

International Preliminary Report on Patentability in corresponding International Application No. PCT/IB010/000536 mailed May 6, 2013.

Sean Rhea, et al.; "Handling Churn in a DHT"; Report No. UCB/CSD-03-1299, computer Science Division (EECS) University of California; Dec. 2003; pp. 1-15; Berkely, CA.

Ingmar Baumgart, et al.; "OverSim: A Flexible Overlay Network Simulation Framework"; IEEE Global Network Symposium; ISBN No. 978-1-4244-1697-4 ; May 11, 2007; pp. 79-84; Anchorage, AK.

David A. Bryan, et al.; "Decentralizing SIP"; ACM Queue, Architecting Tomorrow's Computing; vol. 5 No. 2—Mar. 9, 2007; pp. 1-5. [downloaded from internet on Jun. 12, 2014—http://queue.acm.org/detail.cfm?id=1229910].

C. Jennings, et al.; "REsource LOcation and Discovery (RELOAD) Base Protocol, draft-ietf-p2psip-base-06"; P2PSIP: Internet-Draft: Standards Track, Internet Engineering Task Force (IETF) Request for Comments: 6940; Columbia University; Nov. 9, 2009; pp. 1-149.

Ion Stoica, et al.; "Chord: A Scalable Peer-to-peer Lookup Service for Internet Applications"; SIGCOMM '01 Proceedings of the 2001 conference on Application, technologies, architectures, and protocols for computer communications; Aug. 27-31, 2001; pp. 149-160; San Diego, CA.

\* cited by examiner

LOAD BALANCING METHOD AND SYSTEM FOR PEER-TO-PEER NETWORKS

TECHNICAL FIELD

The present invention generally relates to systems, software and methods and, more particularly, to mechanisms and techniques for load balancing of Peer-to-Peer (P2P) networks.

BACKGROUND

The evolution of computing devices such as computers, mobile phones, game consoles, personal digital assistants, etc., and the limitations of centralized networks have made the concept of a distributed network more attractive. Such a distributed network is called today a peer-to-peer network, or P2P network.

A P2P network includes any distributed network architecture composed of participants that make a portion of their resources (for example, processing power, storage capability or network bandwidth) available to other network participants, without the need for central coordination instances, e.g., servers. The participants in the P2P network, the peers, may be both suppliers and consumers of resources. This is in contrast to the traditional client-server model in which only the server supplies the resources and the clients consume them.

P2P networks often implement an Application Layer overlay network on top of the native or physical network topology. Such overlays are used for indexing and peer discovery. Content is typically exchanged directly over the underlying Internet Protocol (IP) network. P2P networks may be divided into structured networks and unstructured networks.

In structured P2P networks, connections in the overlay are fixed. These networks typically use distributed hash table-based (DHT) indexing, such as in the Chord system, which was described by Stoica et al. in "Chord: A Scalable Peer-to-peer Lookup Service for Internet Applications," Proceedings of the ACM SIGCOMM '01 Conference, August 2001, the entire content of which is incorporated here by reference.

Structured P2P networks employ a globally consistent protocol to ensure that any node can efficiently route a search to some peer that has the desired file. Such a guarantee necessitates a more structured pattern of overlay links. The most common type of structured P2P network is the DHT, in which a variant of consistent hashing is used to assign ownership of each file to a particular peer, in a way analogous to a traditional hash table's assignment of each key to a particular array slot.

Unstructured P2P networks do not provide any algorithm for organization or optimization of network connections.

Structured P2P networks based on DHTs can be enhanced by using load balancing mechanisms. In the context of this application, the term load is understood to mean an amount of network traffic a peer has to forward to other peers. It is believed that efficient load balancing mechanisms are a requirement for P2P networks that are targeted for large-scale deployments.

Current load balancing mechanisms are either trying to achieve an even distribution of objects (e.g., content) among peers, make the address space (as the peers are entering and leaving the network continuously, the address space changes in time and may become unevenly populated) as evenly populated as possible, or both.

Figure 1:
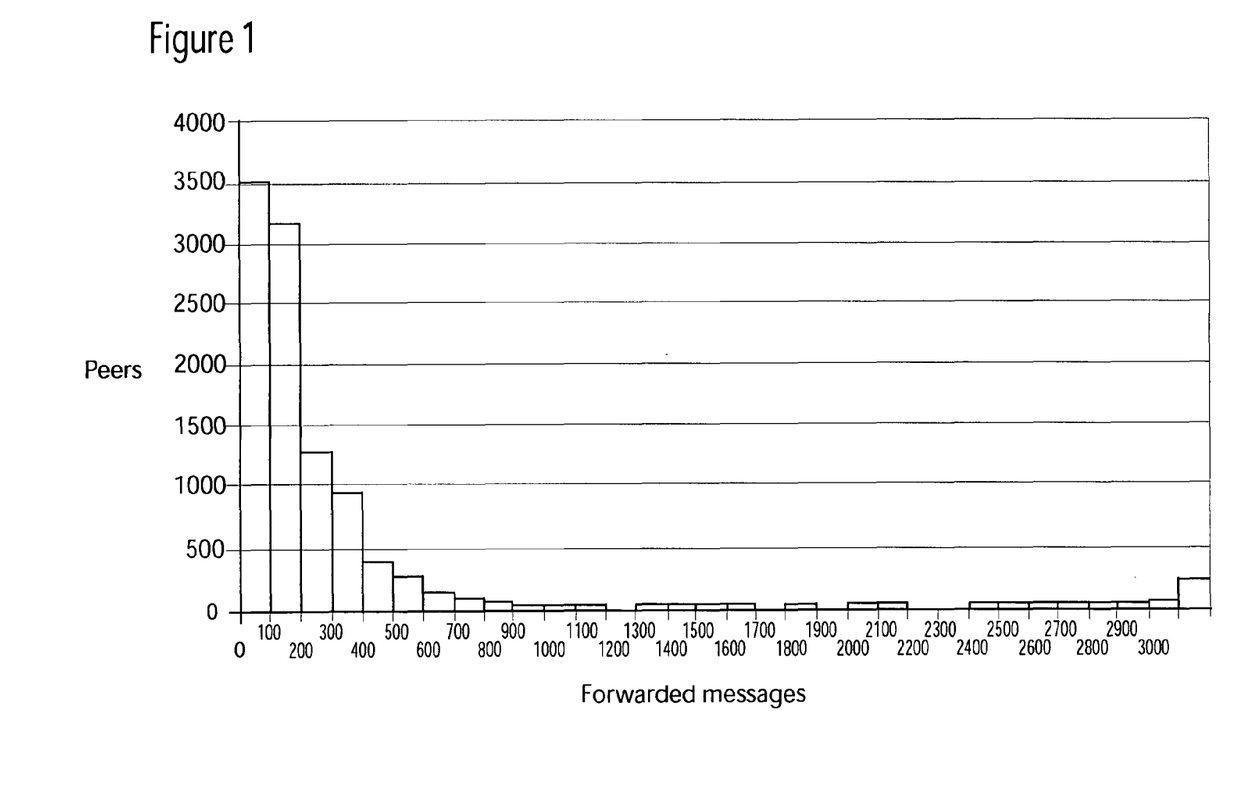
FIG. 1 is a graph indicating the unbalance of message forwarding experienced by peers in a P2P network.

However, the current load balancing mechanisms are limited in their efficiency as shown by FIG. 1. FIG. 1 shows how imbalanced the load is in an unmodified Bamboo network (see Rhea et al., Handling Churn in a DHT, UC Berkeley technical report, CSD-03-1299, December 2003, the entire content of which is incorporated herein by reference). A similar situation is present in a Chord network. The data shown in FIG. 1 is measured based on a real Bamboo implementation. It can be seen from the figure that there are 3491 peers in the network that have forwarded less than 100 messages, and that there are 198 peers that have forwarded more than 3000 messages (the average is 218 messages). If the load would have been evenly distributed, each peer would have forwarded approximately 218 messages. Not visible in the figure, the least loaded peer did not forward any message and the most loaded peer forwarded 34,819 messages. Thus, FIG. 1 indicates that existing balancing methods are not able to cope with the realities in the P2P network.

Next, problems associated with existing load balancing mechanisms are briefly discussed. Many load balancing mechanisms are using the concept of virtual servers. Virtual servers are a technique in which a single physical peer is mapped to multiple virtual peers and each virtual peer has an unrelated peer-id. The problems associated with this technique based on virtual servers are that this technique requires more connections to other peers than the DHTs without virtual servers. This makes the mobile peers to have their battery drained quicker and is unsuitable for middlebox traversal. Also, this concept requires that one physical peer has multiple peer-ids, which makes hard the task of assigning cryptographic peer-ids for peers.

Other load balancing mechanisms are attempting to minimize the variation between partition sizes. In other words, these mechanisms try to create a situation where peers have equally sized partitions. When a new peer joins the network, these mechanisms try to find, by using probes, a relatively large partition in the P2P network, split it, and place the new peer into that partition to reduce the large partition. In addition, some mechanisms also balance partitions when a peer leaves from the P2P network by, for example, changing a peer-id of a peer in the P2P network. One problem with these mechanisms is that peers have to accept arbitrary peer-ids and thus, it is hard to assign cryptographic peer-ids for peers.

One existing load balancing mechanism is using the power of two choices paradigm. The load balancing in this case is focused on creating an even distribution of objects in the P2P network despite the differences in partition sizes. The load balancing works in a manner in which objects are stored to the less loaded of two, or more, peers in the P2P network. A problem with this approach is that it balances only the load related to storing an object, and not the load related to forwarding the network traffic, i.e., some peers are still overloaded in terms of traffic.

To summarize, all of the current solutions have one or more of the following undesirable features: require relatively large number of fingers per peer (which drains battery and is unsuitable for middlebox traversal), require one physical peer to have multiple peer-ids or require peers to accept arbitrary peer-ids (which makes hard to assign cryptographic peer-ids for peers), or balance only the object distribution (i.e., some peers are still overloaded with network traffic).

Accordingly, it would be desirable to provide devices, systems and methods that avoid the afore-described problems and drawbacks.

SUMMARY

A novel approach for load balancing, called FiBal (finger balancing) is not focused on balancing the objects among the peers and does not require an evenly populated address space. Instead, FiBal changes the way how peers are selected as fingers in the overlay routing tables in structured P2P networks. It is an object to overcome some of the deficiencies discussed in the previous section and to provide a load balancing mechanism for more efficiently balancing the peer connections. One or more of the independent claims advantageously implements the novel load balancing mechanism to a P2P network. The FiBal is a generic load balancing mechanism.

According to one exemplary embodiment, there is a method for balancing a number of incoming connections of nodes connected to a peer-to-peer network. The method includes receiving at a selecting node information about out-finger candidates, where the information includes at least a quantifiable parameter for the out-finger candidates and the out-finger candidates are possible nodes to be connected to the selecting node; calculating in the selecting node, for each node of the out-finger candidates, a probability value by using a predetermined probability function that uses as input the corresponding quantifiable parameter; and selecting one node from the out-finger candidates to be an out-finger node for the selection node based on the probability value. The probability value is associated with a number of in-finger connections to the selected out-finger node.

According to another exemplary embodiment, there is a selecting node configured to balance a number of incoming connections of nodes connected to a peer-to-peer network. The selecting node includes an input/output interface configured to receive information about out-finger candidates. The information includes at least a quantifiable parameter for the out-finger candidates and the out-finger candidates are possible nodes to be connected to the selecting node. The selecting node includes a processor connected to the input/output interface. The processor is configured to calculate, for each node of the out-finger candidates, a probability value by using a predetermined probability function that uses as input the corresponding quantifiable parameter received from the input/output interface or stored by the selecting node. The processor selects one node from the out-finger candidates to be an out-finger node for the selection node on the probability value. The probability value is associated with a number of in-finger connections to the selected out-finger node.

According to still another exemplary embodiment, there is a method for balancing a number of incoming connections of nodes connected to a peer-to-peer network. The method includes receiving at a selecting node information about out-finger candidates, wherein the information includes at least a number of in-finger connections for the out-finger candidates and the out-finger candidates are possible nodes to be connected to the selecting node; and selecting one node from the out-finger candidates to be an out-finger node for the selection node based on a lowest value of in-finger connections.

BRIEF DESCRIPTION OF THE DRAWINGS

The accompanying drawings, which are incorporated in and constitute a part of the specification, illustrate one or more embodiments and, together with the description, explain these embodiments. In the drawings.

ABBREVIATIONS

DHT Distributed Hash Table
FiBal Load balancing mechanism.
IETF Internet Engineering Task Force
In-finger Incoming finger (from one peer to another)
Out-finger Outgoing finger (from one peer to another)
P2P Peer-to-Peer
P2PSIP Peer-to-Peer Session Initiation Protocol
RELOAD Resource Location and Discovery

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a structured P2P network with DHT. However, the embodiments to be discussed next are not limited to these networks but may be applied to other existing networks.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 2:
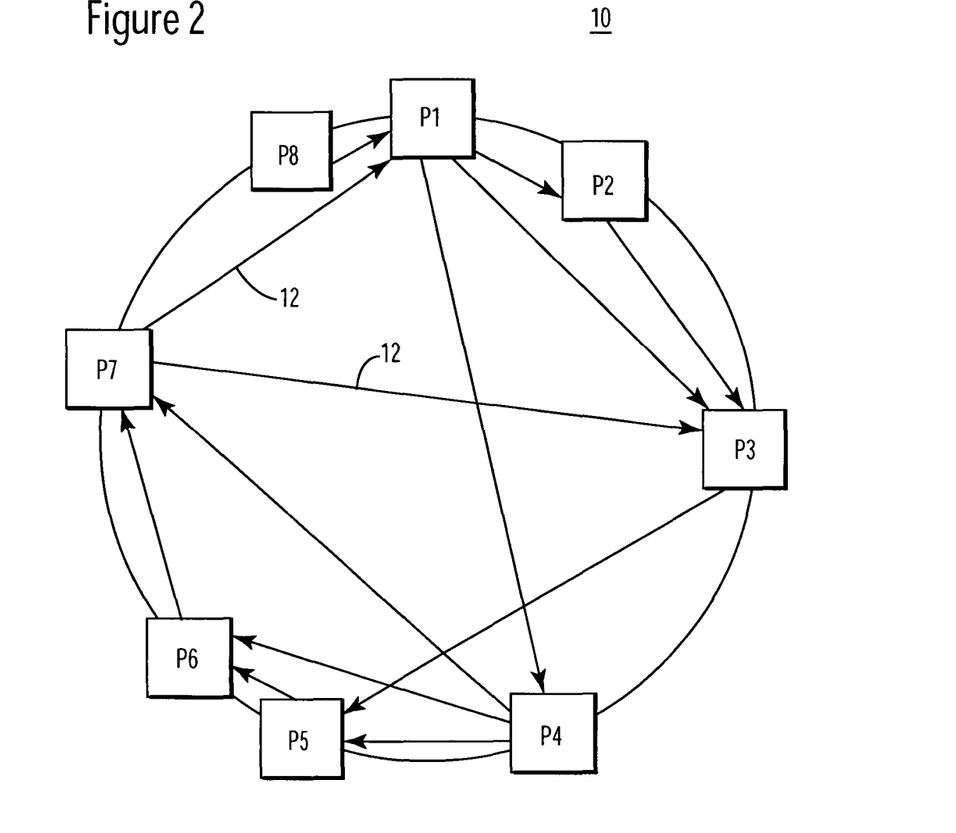
FIG. 2 is a schematic diagram illustrating out-fingers and in-fingers in a P2P network.

According to an exemplary embodiment illustrated in FIG. 2, a P2P network has plural peers P1 to P8. Outgoing connections 12 from one peer to another, as shown in the overlay routing table illustrated in FIG. 1, are known as outgoing fingers or out-fingers. In one application, FiBal does not attempt to balance objects among the peers, and it does not attempt to create an evenly populated address space. Instead, according to this exemplary embodiment, FiBal balances the number of incoming fingers (in-fingers) to each peer in a P2P network. The concepts of out-fingers and in-fingers are illustrated in FIG. 2, in which, for example, peer P1 has 3 out-fingers and 2 in-fingers. The same figure shows that peer P8 has one out-finger and no in-finger. Thus, according to this exemplary embodiment, FiBal tries to balance the number of in-fingers for each peer.

According to an exemplary embodiment, FiBal tries to create a P2P network in which each node has (approximately) the same number of in-fingers. One reason for implementing this feature is the belief that an uneven distribution of in-fingers correlates with an uneven distribution of load. Simulations results appear to validate this belief. Thus, FiBal changes the way how the structured P2P networks select peers as out-fingers in the overlay routing tables of each peer. One novel idea in FiBal is that one or more out-fingers may be selected from a set of out-finger candidates, which is not the case in traditional DHT mechanism where only one candidate exists in unmodified DHT mechanisms. In another exemplary embodiment, each out-finger is selected from the set of out-finger candidates.

According to an exemplary embodiment, FiBal may be specified and implemented as an extension to existing P2P signaling protocols. For example, REsource LOcation And Discovery (RELOAD) is one such signaling protocol. RELOAD (see for example, Jennings et al, "REsource LOcation And Discovery (RELOAD) Base Protocol," IETF, February 2010, the entire content of which is incorporated here by reference) is a P2P signaling protocol that is currently being standardized in the P2PSIP working group at the Internet Engineering Task Force (IETF).

According to one possible implementation of the FiBal, the so called A-mode, the selection between out-finger candidates is based on probabilities. The candidates may be any node (peer) in the P2P network. A node may be a computer, a server, a mobile phone, a personal digital assistant, etc. A predetermined probability function (that is discussed later) is defined and probability values are calculated for each candidate. The probability of a candidate being selected by a selecting node as the out-finger is calculated based on a quantifiable property, e.g., (q), which is characterizing each candidate node in the network. Depending on the network, the quantifiable property may correspond to different parameters. In one application, the quantifiable property q of a given node has to have a positive linear correlation to the number of in-fingers of the given node. In this application, the probability of a node being selected as an out-finger decreases as q increases.

According to an exemplary embodiment, the probability that an $n^{th}$ candidate is selected as an out-finger for an overlay routing table of a selecting node in a scenario where there are k out-finger candidates may be calculated with the following predetermined probability function $P(q_n)$:

$$P(q_n) = \frac{1}{k-1} - \frac{\frac{q_n}{\sum_{i=1}^{k} q_i}}{k-1},$$

where n<k, and $q_i$ is the quantifiable feature for the $i^{th}$ node.

For illustrating the applicability of the A-mode, the following example is used. It is noted that this example is for illustration only and it is not intended to limit the exemplary embodiments. Also, it is noted that this example is a generic example, it is not related to any particular DHT. Other ways for determining the out-finger node of the selecting out-finger are possible.

Figure 3:
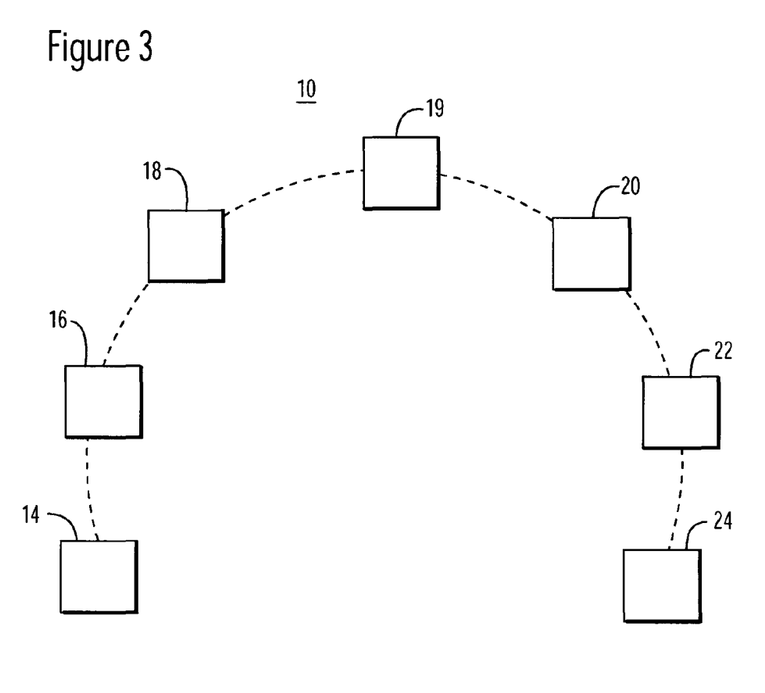
FIG. 3 is a schematic diagram illustrating a selection of out-fingers in a P2P network according to an exemplary embodiment.

According to this example that is illustrated in FIG. 3, suppose that the selecting node 14 needs to determine its out-finger. The out-finger candidates may include nodes 16, 18, 20, 22, and 24 but not node 19. Assume that the quantifiable property q is q1=15 for node 16, q2=5 for node 18, q3=2 for node 20, q4=10 for node 22 and q5=8 for node 24. Using the predetermined probability function P noted above, the following probability values are calculated: p1=0.16, p2=0.22, p3=0.24, p4=0.19, and p5=0.20 for the five nodes.

In one application, the selecting node 14 selects the out-finger node based only on these results, for example, selecting the candidate node having the highest probability p. However, according to another exemplary embodiment, the selecting node generates a random number between 0.0 and 1.0. Further, the selecting node divides an interval between 0.0 and 1.0 into sub ranges based on the probabilities values p1 to p5 calculated above. For example, the first range is 0 to 0.16 (i.e., p1), the second range is 0.16 to 0.38 (i.e., p1 to p1+p2), the third range is 0.38 to 0.62, the fourth range is 0.62 to 0.81 and the firth range is 0.81 to 1.00.

The first range is associated with the first candidate node, the second range is identified with the second candidate node, and so on. Then, the selecting node matches the randomly generated number to a corresponding range and the associated candidate node is selected by the selecting node. For clarity, assume that the random number is 0.72. This number belongs to the fourth range, i.e., 0.62 to 0.81. Because candidate node 22 is associated with this range, the selecting node 12 selects node 22 as its out-finger. As would be appreciated by those skilled in the art, other mechanisms similar to generating the random number may be used to determine the out-finger candidate.

The above discussed mechanism is also capable to handle candidate nodes having the same probability results. For example, consider that there are only three candidates, the first one having p1=0.5, and the second and third candidates having p2=p3=0.25. Suppose that a random number is generated and the three sub ranges are determined to be 0.00 to 0.50 (p1), 0.50 to 0.75 (p1+p2) and 0.75 to 1.00 (p1+p2+p3). The generated random number would uniquely identify one of the three candidates although two of the candidates have the same probability values.

One possible implementation of the above noted mechanism, the A-mode, may be the Chord P2P network, which was introduced in the Background section. Overlay routing tables, or finger tables, are refreshed periodically in Chord. The refreshing is achieved by calling a function that maintains the routing table. FiBal may be implemented by modifying that function to add new logic to it. The quantifiable parameter q may be the partition sizes of the peers as there is a positive linear correlation between the number of in-fingers and the partition sizes of the peers.

In other words, as a result of using FiBal, an out-finger candidate with a small partition is more likely to be selected as an out-finger than a candidate with a larger partition. One reason for this selection is that, in a DHT not using FiBal, the nodes with small partitions are less frequently selected as out-fingers than the nodes with larger partitions. Thus, A-mode of FiBal corrects this imbalance. The implementation of the A-mode in Chord does not require major changes to Chord as the partition size of the nodes is calculated and distributed by the existing Chord networks. Furthermore, there is no need to explicitly convey partition size information between the nodes.

According to another exemplary embodiment, the A-mode of the FiBal may be implemented in a Bamboo network. In Bamboo, the overlay routing table is refreshed by using local and global tuning processes. The A-mode FiBal is configured to modify both of these processes. Based on simulation results, it has been observed that there is a positive linear correlation between the number of in-fingers and the number of forwarded application level packets in Bamboo. Unlike in Chord, there is no correlation between the number of in-fingers and the partition sizes.

Thus, according to this exemplary embodiment, the A-mode of FiBal in Bamboo utilizes the above mentioned correlation, i.e., the quantifiable parameter is the number of forwarded application level packets. In another exemplary embodiment, a sliding sum of the forwarded application level packets by the node is used as the quantifiable property q. The sliding sum is defined to include only packets forwarded by the node in the last h seconds. Thus, an out-finger candidate which has forwarded only few application level packets in the last h seconds is more likely to be selected as an out-finger than a candidate which has forwarded a large amount of packets in the last h seconds.

Unlike in Chord, the implementation of A-mode in Bamboo is more challenging as the A-mode may require continuous tracking of application level packets and an ability to convey the sliding sum of forwarded application level packets to other nodes/peers.

Although the implementation of the A-mode of the FiBal was discussed with regard to Chord and Bamboo P2P networks, all the other P2P networks may be configured to load balance the out-fingers based on the novel features of the discussed exemplary embodiments.

Figure 4:
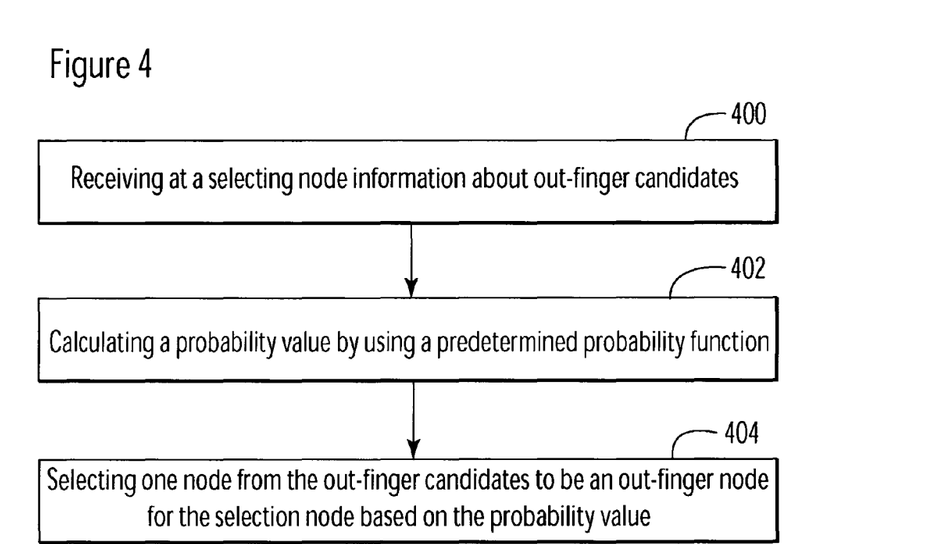
FIG. 4 is a flow chart illustrating a method for implementing an A-mode solution in a P2P network according to an exemplary embodiment.

According to an exemplary embodiment illustrated in FIG. 4, there is a method for balancing a number of incoming connections of nodes connected to a peer-to-peer network. The method includes a step 400 of receiving at a selecting node information about out-finger candidates, where the information includes at least a quantifiable parameter for the out-finger candidates and the out-finger candidates are possible nodes to be connected to the selecting node, a step 402 of calculating in the selecting node, for each node of the out-finger candidates, a probability value by using a predetermined probability function that uses as input the corresponding quantifiable parameter, and a step 404 of selecting one node from the out-finger candidates to be an out-finger node for the selection node based on the probability value. The probability value is associated with a number of in-finger connections to the selected out-finger node.

Next, the B-mode of the FiBal mechanism is discussed and also possible implementations in Chord and Bamboo. In the B-mode the selection between out-finger candidates is performed by accepting an out-finger candidate that has the lowest number of in-fingers. For this reason, the B-mode nodes need to keep track of how many in-fingers they have at all times and they have to have an ability to convey their in-finger counts to other nodes. For example, the nodes may piggyback the information regarding the in-finger counts on the standard messages exchanged by the nodes.

Both the A- and B-modes may have an optional parameter ($k_m$) that defines the maximum number of out-finger candidates ($k \leq k_m$). The reason for introducing $k_m$ is that it allows a network to make a tradeoff between simplicity and efficiency.

According to an exemplary embodiment, both modes of the FiBal mechanism may be extended if the underlying P2P network has diagnostics capabilities. The extension may take into account aspects like processing power, amount of memory, and available bandwidth of a node when choosing an out-finger among the candidates. For example, a lightweight mobile node (peer) may be selected as an out-finger less frequently than a desktop computer. Other criteria may be used as well.

Returning to the B-mode, its implementation in the Chord P2P network is discussed next. The B-mode in Chord does not use partition sizes. The B-mode performs the out-finger candidate selection based on in-finger counts instead. Thus, Chord may need to have additional capabilities in order to support the B-mode. Each node/peer needs to keep track of how many in-fingers they have and each node has to be able to convey the number of in-fingers to other nodes. Thus, the A-mode is easier to implement in Chord than the B-mode as the A-mode requires relatively minor changes or no changes to the Chord mechanism.

Regarding the Bamboo network, the B-mode does not use the sliding sum of the forwarded application level packets as the A-mode. Instead, the B-mode performs the out-finger candidate selection based on the in-finger counts. Thus, Bamboo may need to have some additional capabilities in order to support the B-mode. Each node may need to keep track of how many in-fingers they have and each node has to be able to communicate the number of in-finger to other nodes.

Figure 5:
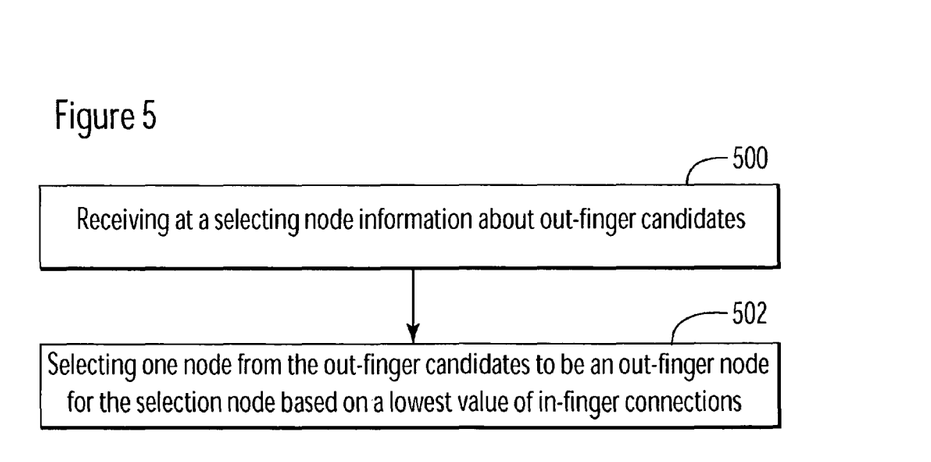
FIG. 5 is a flow chart illustrating a method for implementing a B-mode solution in a P2P network according to an exemplary embodiment.

According to an exemplary embodiment illustrated in FIG. 5, there is a method for balancing a number of incoming connections of nodes connected to a peer-to-peer network. The method includes a step 500 of receiving at a selecting node information about out-finger candidates, where the information includes at least a number of in-finger connections for the out-finger candidates and the out-finger candidates are possible nodes to be connected to the selecting node, and a step 502 of selecting one node from the out-finger candidates to be an out-finger node for the selection node based on a lowest value of in-finger connections.

Figure 6:
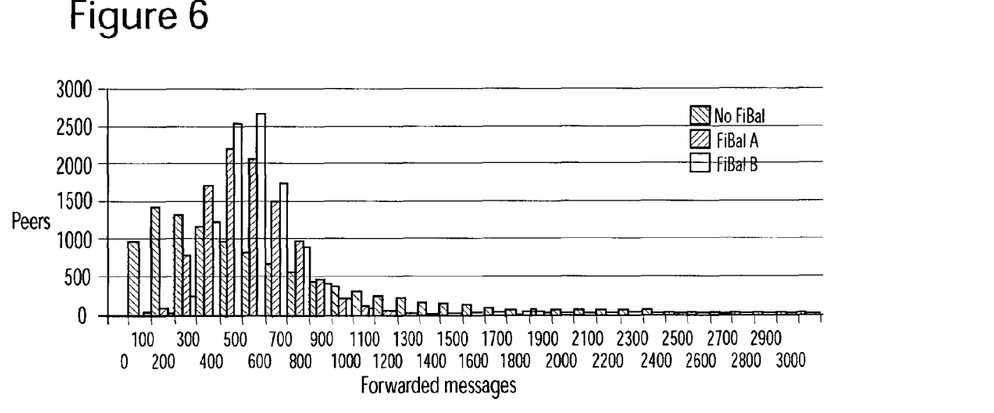
FIG. 6 is a graph indicating the improved load balancing in a Chord network according to an exemplary embodiment.
Figure 7:
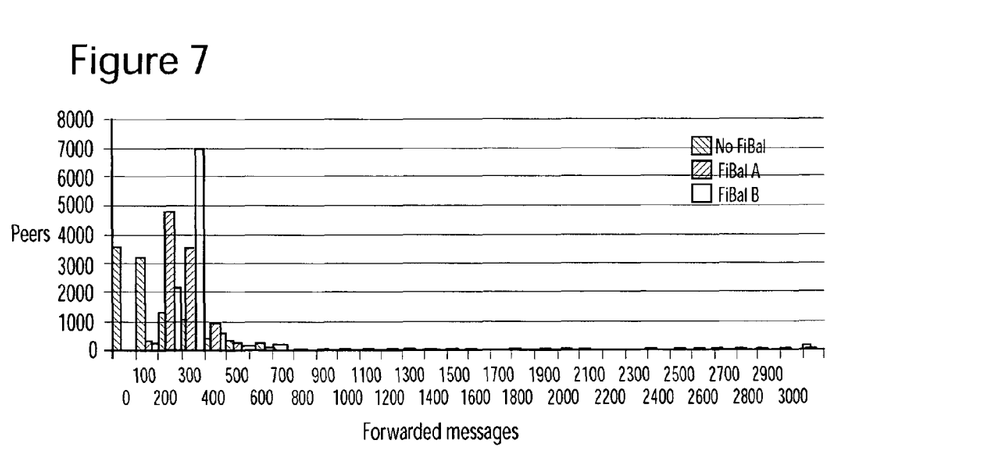
FIG. 7 is a graph indicating the improved load balancing in a Bamboo network according to an exemplary embodiment.

The effectiveness of the FiBal mechanism has been simulated for both the Chord and Bamboo networks and these results are illustrated in FIGS. 6 and 7. The results indicate that FiBal provides good load balancing properties. For example, FIG. 6 shows that FiBal distributes the network traffic (i.e., forwarded messages) relatively evenly among the peers.

Comparing the results of FIGS. 6 and 7 with those of FIG. 1, it can be seen that FiBal produces more even load distributions than unmodified Chord and Bamboo. In one embodiment the B-mode produces better results than the A-mode. Further, it is observed that the average number of forwarded messages was 543 in Chord and 224 in Bamboo. Though not visible in the figures, the most loaded peer in unmodified Bamboo forwarded 34,819 messages while the same most loaded peer in modified Bamboo with FiBal (B-mode) forwarded only 599 messages.

Thus, FiBal provides load balancing for structured P2P networks in an efficient manner without the disadvantages of the existing load balancing approaches. One or more advantages shared by one or more of the exemplary embodiments are the following. The FiBal does not need more than one peer-id per peer and thus, cryptographic peer-ids can be assigned to peers and only one certificate per peer is required. Peer-ids may be chosen freely, e.g., cryptographic peer-ids can be assigned and used for a long time by the peers. The FiBal may be extended if diagnostics information is available, e.g., mobile peers are chosen less frequently as out-fingers than desktop computers. The FiBal is a generic mechanism and thus, it is not limited to specific P2P networks. In other words, it is feasible to implement FiBal to different P2P algorithms, e.g., can be utilized with many DHTs. Further, the implementation of FiBal does not increase the number of fingers in a P2P network, which is suitable for middlebox traversal and Internet, and results in lower battery consumption.

Figure 8:
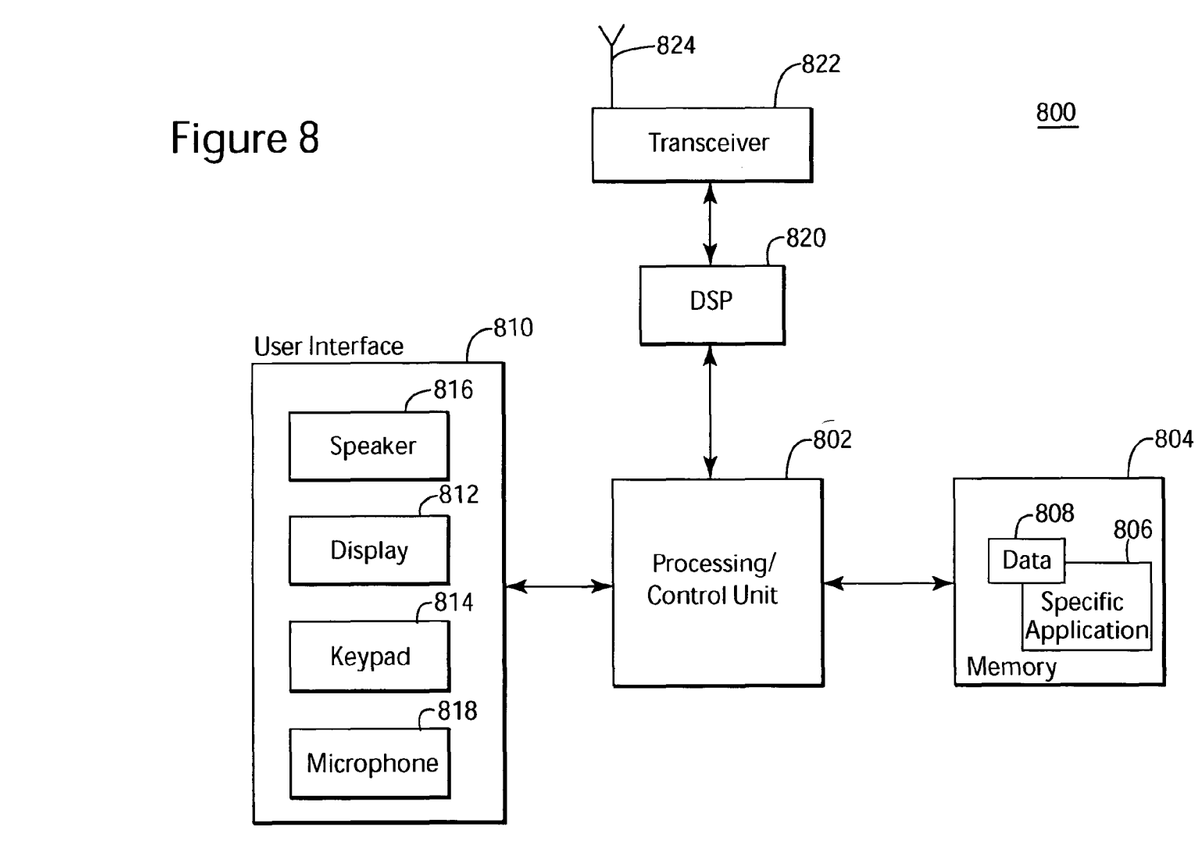
FIG. 8 is a schematic diagram illustrating the structure of a node.

For purposes of illustration and not of limitation, an example of a representative node/peer capable of carrying out operations in accordance with the exemplary embodiments is illustrated in FIG. 8. It should be recognized, however, that the principles of the present exemplary embodiments are equally applicable to other computing systems.

The exemplary node 800 may include a processing/control unit 802, such as a microprocessor, reduced instruction set computer (RISC), or other central processing module. The processing unit 802 need not be a single device, and may include one or more processors. For example, the processing unit 802 may include a master processor and associated slave processors coupled to communicate with the master processor.

The processing unit 802 may control the basic functions of the system as dictated by programs available in the storage/memory 804. Thus, the processing unit 802 may execute the functions described in FIGS. 4 and 5. More particularly, the storage/memory 804 may include an operating system and program modules for carrying out functions and applications on the node. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the node 800 via data signals, such as being downloaded electronically via a network, such as the Internet.

One of the programs that may be stored in the storage/memory 804 is a specific program 806. As previously described, the specific program 806 may calculate probability values or perform mathematical operations. The program 806 and associated features may be implemented in software and/or firmware operable by way of the processor 802. The program storage/memory 804 may also be used to store data 808, such as the DHT routing tables, or other data associated with the present exemplary embodiments. In one exemplary embodiment, the programs 806 and data 808 are stored in non-volatile electrically-erasable, programmable ROM (EEPROM), flash ROM, etc. so that the information is not lost upon power down of the node 800.

The processor 802 may also be coupled to user interface 810 elements associated with a mobile terminal. The user interface 810 of the mobile terminal may include, for example, a display 812 such as a liquid crystal display, a keypad 814, speaker 816, and a microphone 818. These and other user interface components are coupled to the processor 802 as is known in the art. The keypad 814 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

Node 800 may also include a digital signal processor (DSP) 820. The DSP 820 may perform a variety of functions, including analog-to-digital (A/D) conversion, digital-to-analog (D/A) conversion, speech coding/decoding, encryption/decryption, error detection and correction, bit stream translation, filtering, etc. The transceiver 822, generally coupled to an antenna 824, may transmit and receive the radio signals associated with a wireless device.

Node 800 of FIG. 8 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 806 and associated features, and data 808, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

The disclosed exemplary embodiments provide a node, a method and a computer program product for load balancing of out-fingers in a P2P network. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for balancing a number of incoming connections of nodes connected to a peer-to-peer network, the method comprising:

receiving at a selecting node information about out-finger candidates, wherein the information includes at least a quantifiable parameter for the out-finger candidates and the out-finger candidates are possible nodes to be connected to the selecting node;

calculating in the selecting node, for each node of the out-finger candidates, a probability value by using a predetermined probability function that uses as input the corresponding quantifiable parameter;

selecting one node from the out-finger candidates to be an out-finger node for the selection node based on the probability value, wherein the probability value is associated with a number of in-finger connections to the selected out-finger node;

using overlay routing tables for maintaining connections among the nodes;

generating a random number at the selecting node;

associating each out-finger candidate with a numerical range determined based on the probability values of the out-finger candidates; and selecting the out-finger node from the range that also includes the random number.

2. The method of claim 1, wherein there is a positive linear correlation between the quantifiable parameter of a node and a number of in-finger connections to that node from other nodes.

3. The method of claim 1, wherein the probability function is given by $$P_n = \frac{1}{k-1} - \frac{\frac{q_n}{\sum_{i=1}^{k} q_i}}{k-1},$$

where k is the number of out-finger candidates, $q_i$ is the quantifiable parameter of an $i^{th}$ node, and n is a current node.

4. The method of claim 1, wherein the overlay routing tables are refreshed by calling a predetermined function.

5. The method of claim 4, further comprising:
modifying the predetermined function to include the probability function.

6. The method of claim 1, wherein the quantifiable parameter is a partition size of a node, where the partition size is defined as a difference between an ID number of a previous node and an ID number of a current node from the overlay routing tables.

7. The method of claim 6, further comprising:
correcting an imbalance of selected out-finger nodes by selecting more often out-finger candidates having a small partition size comparative with out-finger candidates having a large partition size, where the large partition size is larger than the small partition size.

8. The method of claim 6, further comprising:
calculating a partition size of a given node at the given node.

9. The method of claim 6, wherein the peer-to-peer network is a Chord network.

10. The method of claim 1, wherein the overlay routing tables are refreshed by local and global tuning processes.

11. The method of claim 10, further comprising:
modifying the local and global tuning processes to include the probability function.

12. The method of claim 10, wherein the quantifiable parameter is a sliding sum of a number of forwarded application level packets by a current node, where the sliding sum is defined as the number of forwarded application level packets by the current node in a given amount of time.

13. The method of claim 10, wherein the peer-to-peer network is a Bamboo network.

14. The method of claim 12, further comprising:
correcting an imbalance of selected out-finger nodes by selecting more often out-finger candidates having a small sliding sum comparative with out-finger candidates having a large sliding sum, where the large sliding sum is larger than the small sliding sum.

15. A selecting node configured to balance a number of incoming connections of nodes connected to a peer-to-peer network, the selecting node comprising:
an input/output interface configured to receive information about out-finger candidates, wherein the information includes at least a quantifiable parameter for the out-finger candidates and the out-finger candidates are possible nodes to be connected to the selecting node;
a processor connected to the input/output interface and configured to,
calculate, for each node of the out-finger candidates, a probability value by using a predetermined probability function that uses as input the corresponding quantifiable parameter received by the input/output interface or stored by the selecting node, and
select one node from the out-finger candidates to be an out-finger node for the selection node on the probability value, wherein the probability value is associated with a number of in-finger connections to the selected out-finger node; and
a memory connected to the processor and configured to store overlay routing tables for maintaining connections among the nodes,
wherein the processor is further configured to:
generate a random number at the selecting node;
associate each out-finger candidate with a numerical range determined based on the probability values of the out-finger candidates; and
select the out-finger node from the range that also includes the random number.

16. The selecting node of claim 15, wherein there is a positive linear correlation between the quantifiable parameter of a node and a number of in-finger connections to that node from other nodes.

17. The selecting node of claim 15, wherein the probability function is given by $$P_n = \frac{1}{k-1} - \frac{\frac{q_n}{\sum_{i=1}^{k} q_i}}{k-1},$$

where k is the number of out-finger candidates, $q_i$ is the quantifiable parameter of an $i^{th}$ node, and n is a current node.

18. The selecting node of claim 15, wherein the overlay routing tables are refreshed by calling a predetermined function.

19. The selecting node of claim 18, further comprising:
modifying the predetermined function to include the probability function.

20. The selecting node claim 15, wherein the quantifiable parameter is a partition size of a node, where the partition size is defined as a difference between an ID number of a previous node and an ID number of a current node from the overlay routing tables.

* * * * *

UNITED STATES PATENT AND TRADEMARK OFFICE
CERTIFICATE OF CORRECTION

PATENT NO. : 8,976,706 B2  
APPLICATION NO. : 13/582544  
DATED : March 10, 2015  
INVENTOR(S) : Maenpaa et al.

Page 1 of 1

It is certified that error appears in the above-identified patent and that said Letters Patent is hereby corrected as shown below:

On the title page item [75], Line 3, delete "Krikkonummi (FI)" and insert -- Kirkkonummi (FI) --, therefor.

In the Claims

Column 12, Line 51, Claim 20, delete "node claim" and insert -- node of claim --, therefor.

Signed and Sealed this  
First Day of September, 2015

Michelle K. Lee  
*Director of the United States Patent and Trademark Office*